US012752697B2

(12) United States Patent
Terayama et al.

(10) Patent No.: US 12,752,697 B2
(45) Date of Patent: Oct. 6, 2026

(54) VEHICLE LAMP SYSTEM, CONTROL DEVICE, ILLUMINATING STATE RESTRICTION METHOD, AND RECORDING MEDIUM

(71) Applicant: KOITO MANUFACTURING CO., LTD., Tokyo (JP)

(72) Inventors: Takashi Terayama, Shizuoka (JP); Hikaru Nagai, Shizuoka (JP); Kana Serizawa, Shizuoka (JP); Saki Nakamura, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 12 days.

(21) Appl. No.: 19/110,854

(22) PCT Filed: Sep. 5, 2023

(86) PCT No.: PCT/JP2023/032350
§ 371 (c)(1),
(2) Date: Mar. 12, 2025

(87) PCT Pub. No.: WO2024/058003
PCT Pub. Date: Mar. 21, 2024

(65) Prior Publication Data

US 2026/0084611 A1 Mar. 26, 2026

(30) Foreign Application Priority Data

Sep. 14, 2022 (JP) ................................ 2022-146513

(51) Int. Cl.
*B60Q 1/14* (2006.01)

(52) U.S. Cl.
CPC ...... *B60Q 1/1423* (2013.01); *B60Q 2300/054* (2013.01); *B60Q 2300/322* (2013.01); *B60Q 2300/41* (2013.01)

(58) Field of Classification Search
CPC ...... F21S 41/255; F21S 41/663; F21S 41/635; F21S 41/143; F21S 41/151; F21S 41/153;
(Continued)

(56) References Cited

U.S. PATENT DOCUMENTS

2011/0001436 A1* 1/2011 Chemel ................ H05B 47/155
315/291
2021/0354619 A1 11/2021 Mimoun

FOREIGN PATENT DOCUMENTS

DE 10 2012 109 068 A1 6/2014
DE 10 2017 001 505 A1 8/2018
(Continued)

OTHER PUBLICATIONS

International Search Report for PCT/JP2023/032350 dated Nov. 21, 2023.

(Continued)

*Primary Examiner* — Monica C King
(74) *Attorney, Agent, or Firm* — Sughrue Mion, PLLC

(57) ABSTRACT

A vehicle lamp system includes: a vehicle lamp that can form a high-beam light-distribution pattern in which a state of illuminating one or some illuminated regions is changed among illuminated regions that are separate in a vehicle-width direction; and a controller that can control the vehicle lamp to restrict the state of illuminating the one or some illuminated regions, based on position information having a correlation with the position of a vehicle ahead. The controller calculates a predicted position to which the vehicle ahead is predicted to move after a fixed time period from a reference time, based on the position information acquired anew at the reference time, an amount of change in position of the vehicle ahead calculated from pieces of the position information acquired during a predetermined time period
(Continued)

before the reference time, and information on a travel road on which the vehicle ahead travels.

10 Claims, 5 Drawing Sheets

(58) Field of Classification Search
CPC ...... F21S 41/148; F21S 41/675; F21S 41/698; F21S 41/14; F21S 41/141; F21S 41/16; F21S 41/32; F21S 41/657; F21S 41/689; F21S 41/00; F21S 41/162; F21S 41/17; F21S 41/176; F21S 41/19; F21S 41/20; F21S 41/25; F21S 41/36; F21S 41/39; F21S 41/43; F21S 41/60; F21S 41/645; H05B 47/10; H05B 45/00; H05B 45/10; H05B 45/14; H05B 45/345; H05B 45/37; H05B 45/3725; H05B 45/375; H05B 45/48; H05B 47/105; H05B 47/11; H05B 47/14; H05B 47/16; B60Q 1/143; B60Q 2300/056; B60Q 2300/41; B60Q 2300/42; B60Q 1/085; B60Q 1/1423; B60Q 2300/054; B60Q 1/12; B60Q 2300/122; B60Q 2300/112; B60Q 2300/45; B60Q 1/14; B60Q 2300/322; B60Q 2300/314; B60Q 2300/336; B60Q 1/08; B60Q 1/115; B60Q 1/122; B60Q 11/00; B60Q 2300/146; B60Q 2300/332; B60Q 1/0023; B60Q 1/04; B60Q 1/381; B60Q 2300/136; B60Q 2300/312; B60Q 1/0076; B60Q 1/0094; B60Q 1/02; B60Q 1/1407; B60Q 1/16; B60Q 1/46; B60Q 2300/052; B60Q 2300/30; B60Q 2300/334; B60Q 2300/337; B60Q 2300/43
See application file for complete search history.

(56) References Cited

FOREIGN PATENT DOCUMENTS

| | | | |
|---|---|---|---|
| JP | 2012-001078 | A | 1/2012 |
| WO | 2020/070079 | A1 | 4/2020 |

OTHER PUBLICATIONS

Extended European Search Report dated Dec. 1, 2025 from the European Patent Office in Application No. 23865358.8.

* cited by examiner

VEHICLE LAMP SYSTEM, CONTROL DEVICE, ILLUMINATING STATE RESTRICTION METHOD, AND RECORDING MEDIUM

CROSS REFERENCE TO RELATED APPLICATIONS

This application is a National Stage of International Application No. PCT/JP2023/032350 filed Sep. 5, 2023, claiming priority based on Japanese Patent Application No. 2022-146513 filed Sep. 14, 2022.

TECHNICAL FIELD

The present invention relates to a vehicle lamp system and various technologies of controlling the same.

BACKGROUND ART

Conventionally, there has been devised a vehicle lamp system that forms a light-distribution pattern in which non-illumination is created in part of a high beam by dividing a light-distribution pattern forming a high beam into a plurality of regions, configuring the regions to be able to be partially lit up, and supplementally adding the high-beam light-distribution pattern to a low-beam light-distribution pattern (Patent Literature 1). In the case of such a vehicle lamp system, the distance to, or the position of, a vehicle ahead for which glare should be considered is identified based on information from a detection device, such as a camera or a radar, and light is blocked out in a relevant region. By performing such control, it is made possible to prevent glare from being given, while maintaining high-beam illuminated regions to an extent possible.

However, in the case of the conventional vehicle lamp system, information (data) acquired by the camera, radar, or the like is transferred first to a processing device, which then performs computational processing and calculates the distance to, or the position of, the vehicle ahead. Then, based on a result thereof, a light-distribution pattern is determined, or a region where light is blocked is determined, and a lamp unit is controlled. For a time period from the acquisition of information by the camera or the like until the control of the lamp unit, a processing time period of approximately several tens of milliseconds to several hundreds of milliseconds is needed in general, depending on the size of the information and computational operation speed. In addition, a transfer time period for the information and a control signal also needs to be added to the processing time period. In other words, even if the vehicle ahead for which glare should be restricted is confirmed by the camera or the like, it is after the passage of the processing time period that light-distribution patterns are actually switched. Accordingly, in the vehicle lamp system according to Patent Literature 1, a time period taken before actual light-blocking control can be performed by processing information acquired by the camera or the like is obtained beforehand through a test or the like, a position to which the vehicle ahead moves after the time period is predicted, the predicted position is set as a control-target region, and then illumination control is performed.

CITATION LIST

Patent Literature

Patent Literature 1: Japanese Unexamined Patent Application Publication No. 2012-001078 (JP 2012-001078 A)

SUMMARY OF INVENTION

Technical Problem

As a result of continuous earnest study of the above-described vehicle lamp system that performs prediction control, the present inventors have come to recognize that there is room for improvement in the conventional system, in terms of restricting glare given to the driver of a vehicle ahead.

The present invention has been made in view of such circumstances, and an exemplary object thereof is to provide a new technology that restricts glare given to the driver of a vehicle ahead.

Solution to Problem

To solve the problem, a vehicle lamp system as an aspect of the present invention includes: a vehicle lamp that is able to form a high-beam light-distribution pattern in which a state of illuminating one or some illuminated regions is changed among illuminated regions that are separate in a vehicle-width direction ahead of an own vehicle; and a controller that is able to control the vehicle lamp in such a manner as to restrict the state of illuminating the one or some illuminated regions, based on position information having a correlation with a position of a vehicle ahead. The controller calculates a predicted position to which the vehicle ahead is predicted to move after a fixed time period from a reference time, based on the position information that is acquired anew at the reference time, an amount of change in position of the vehicle ahead calculated from pieces of the position information that is acquired during a predetermined time period before the reference time, and information on a travel road on which the vehicle ahead travels.

According to the aspect, it is possible to more accurately calculate the predicted position to which the vehicle ahead is predicted to move after the fixed time period from the reference time.

The controller may control the vehicle lamp in such a manner as to restrict the state of illuminating the one or some illuminated regions including the predicted position. Thus, it is possible to restrict glare given to the driver of the vehicle ahead, according to the travel road on which the vehicle ahead travels.

The vehicle lamp may include a light source that is able to change a state of illuminating each of 100 or more illuminated regions individually that are separate in the vehicle-width direction in the high-beam light-distribution pattern. In the case of the light-distribution pattern including 100 or more separate illumination regions in the vehicle-width direction, each illuminated region produces a high definition in many cases. Accordingly, when a region where illumination should naturally be restricted as the vehicle ahead moves is left in an illuminated state, the driver of the vehicle ahead immediately feels glare. Accordingly, by accurately calculating the predicted position, it is possible to restrict glare given to the driver.

The controller may include: a counter that, in the predetermined time period before the reference time, counts a number of cases where a difference between the (i+1)-th (i=1 to n) position information on the vehicle ahead and the i-th position information on the vehicle ahead is a positive value and a number of cases where the difference is a negative value, individually; and a travel road determiner that determines whether the travel road on which the vehicle ahead travels is a curve, based on a number of counts C1 of the case where the difference is a positive value and a number of counts C2 of the case where the difference is a negative value. The travel road determiner may determine that the travel road is a curve when $|C1-C2|>A$ (A being a predetermined positive number). Thus, it is possible to determine whether the travel road is a curve, based on the difference between the (i+1)-th (i=1 to n) position information on the vehicle ahead and the i-th position information on the vehicle ahead.

The controller varies, depending on whether the travel road is a curve, a weighting coefficient of the amount of change in position used in the calculation of the predicted position. Thus, it is possible to calculate the predicted position according to the travel road.

In the controller, a weighting coefficient D1 of the amount of change in position used when $|C1-C2|>A$ (A being a predetermined positive number) is greater than a weighting coefficient D2 of the amount of change in position used when $|C1-C2|\leq A$. Thus, in a situation where the probability is high that the travel road is a curve, it is possible to enhance following performance in the control of restricting the state of illuminating the one or some regions including the predicted position.

In the controller, a predetermined time period T1 used to calculate the amount of change in position when $|C1-C2|>A$ (A being a predetermined positive number) is shorter than a predetermined time period T2 used to calculate the amount of change in position when $|C1-C2|\leq A$. Thus, for example, in a situation where the travel road changes from a straight line into a curve, by decreasing the impact of the amount of change in position of the vehicle ahead at the time of traveling in a straight line and increasing the impact of the amount of change in position at the time of traveling on the curve, it is possible to enhance following performance in the control of restricting the state of illuminating the one or some regions including the predicted position.

Another aspect of the present invention is a control device. The device is a control device that controls a vehicle lamp that is able to form a high-beam light-distribution pattern in which a state of illuminating one or some illuminated regions is changed among illuminated regions that are separate in a vehicle-width direction ahead of an own vehicle, and the device includes a controller that is able to control the vehicle lamp in such a manner as to restrict the state of illuminating the one or some illuminated regions, based on position information having a correlation with a position of a vehicle ahead. The controller calculates a predicted position to which the vehicle ahead is predicted to move after a fixed time period from a reference time, based on the position information that is acquired anew at the reference time, an amount of change in position of the vehicle ahead calculated from pieces of the position information that is acquired during a predetermined time period before the reference time, and information on a travel road on which the vehicle ahead travels.

According to the aspect, it is possible to more accurately calculate the predicted position to which the vehicle ahead is predicted to move after the fixed time period from the reference time.

Yet another aspect of the present invention is an illuminating state restriction method. The method is an illuminating state restriction method of controlling, based on position information having a correlation with a position of a vehicle ahead, a vehicle lamp that is able to form a high-beam light-distribution pattern in which a state of illuminating one or some illuminated regions is changed among illuminated regions that are separate in a vehicle-width direction ahead of an own vehicle, in such a manner as to restrict the state of illuminating the one or some illuminated regions, and the method includes a step of calculating a predicted position to which the vehicle ahead is predicted to move after a fixed time period from a reference time, based on the position information that is acquired anew at the reference time, an amount of change in position of the vehicle ahead calculated from pieces of the position information that is acquired during a predetermined time period before the reference time, and information on a travel road on which the vehicle ahead travels.

According to the aspect, it is possible to more accurately calculate the predicted position to which the vehicle ahead is predicted to move after the fixed time period from the reference time.

Any combinations of the above constituent elements, as well as methods such as a manufacture method and a control method, devices such as a lamp, a light, and a control device, a light-emitting module, a light source, a program, a computer-readable recording medium, and the like that are translated from the expressions of the present invention, are also effective as aspects of the present invention.

Advantageous Effects of Invention

According to the present invention, it is possible to restrict glare given to the driver of a vehicle ahead.

DESCRIPTION OF EMBODIMENTS

Hereinafter, the present invention is described with reference to the drawings, based on a preferred embodiment. The same or equivalent constituent elements, members, and processes shown in the individual drawings are denoted by the same signs, and a duplicate description is omitted as appropriate. The embodiment is intended for illustrative purposes, not intended to limit the invention, and all characteristics and combinations thereof described in the embodiment are not necessarily essential to the invention.

Figure 1:
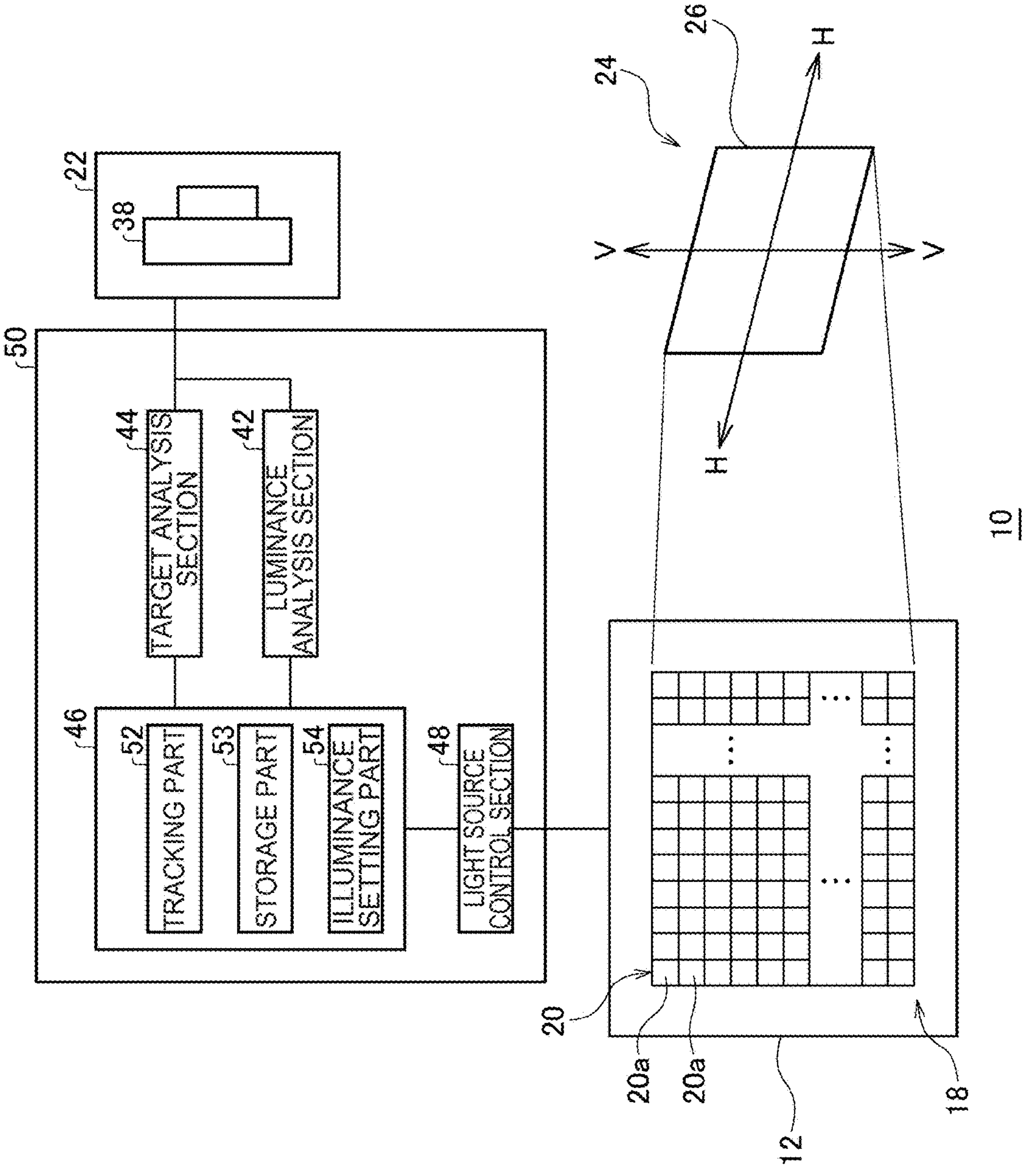
FIG. 1 is a diagram showing a schematic configuration of a vehicle lamp system according to the present embodiment.

FIG. 1 is a diagram showing a schematic configuration of a vehicle lamp system according to the present embodiment. In FIG. 1, some of the constituent elements of a vehicle lamp system 10 are depicted as functional blocks. The functional blocks are implemented by elements and circuits including a CPU and memory of a computer as hardware components, and are implemented by a computer program or the like as a software component. It is to be understood by those skilled in the art that the functional blocks can be implemented in various forms, according to combinations of hardware and software.

The vehicle lamp system 10 is applied to a vehicle headlamp device including a pair of headlamp units disposed at the right and left in front of a vehicle. Since the headlamp units have substantially the same configuration except the point that the pair has a bilaterally symmetrical structure, FIG. 1 shows a structure of one headlamp unit as a vehicle lamp 12.

In the vehicle lamp 12 included in the vehicle lamp system 10, a light source unit 20 is provided in a lamp chamber 18. The vehicle lamp system 10 includes an image capturing unit 22 and a controller 50 provided outside of the vehicle lamp 12. The light source unit 20 is a device that can independently adjust the illuminance (intensity) of light shone at each of multiple individual regions (illuminated regions) aligned ahead of the own vehicle. The light source unit 20 according to the present embodiment is an adaptive lamp in which a plurality of semiconductor light-emitting elements 20*a* is arrayed in a matrix. For the semiconductor light-emitting elements 20*a*, light emitting diodes (LEDs), laser diodes (LDs), electroluminescence (EL) elements, or the like can be used.

A beam ejected from each semiconductor light-emitting element 20*a* of the light source unit 20 is shone on a virtual vertical screen 24 via an undepicted optical system. The optical system may be, for example, a projection lens or a reflector. On the virtual vertical screen 24, a light-distribution pattern 26 is formed that corresponds to on and off of the semiconductor light-emitting elements 20*a*.

Figure 2:
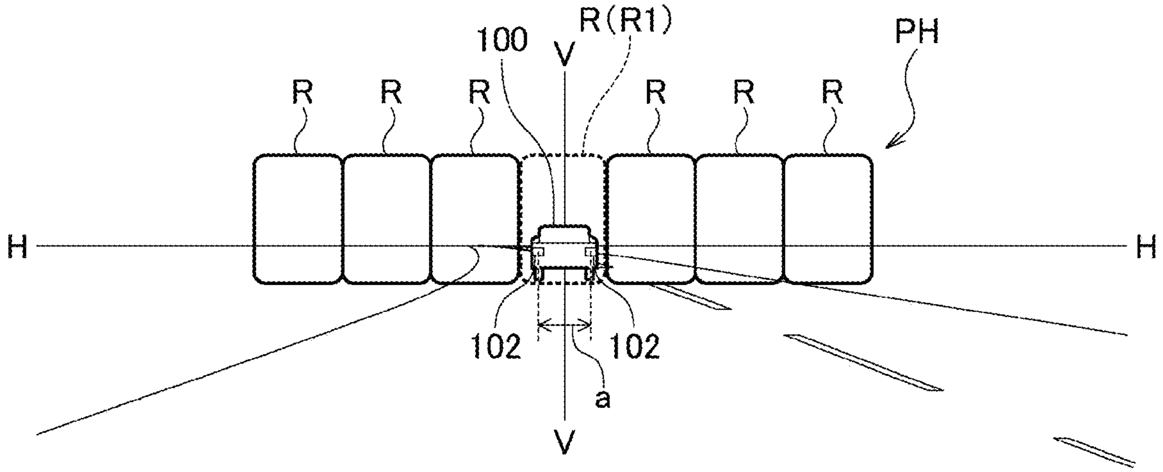
FIG. 2 is a diagram schematically showing a view ahead of an own vehicle.

FIG. 2 is a diagram schematically showing a view ahead of the own vehicle. As mentioned above, the light source unit 20 includes the semiconductor light-emitting elements 20*a* as individual illumination parts that can shine light forward of the lamp independently of each other. The light source unit 20 can shine light at a plurality of individual regions R aligned ahead of the own vehicle, according to the controller 50. Each individual region R is a region corresponding to one pixel, or a set of pixels, of the image capturing unit 22, more specifically, a camera, for example.

Although the semiconductor light-emitting elements 20*a* are shown in a 10-wide×10-high array in FIG. 1 for convenience of description, the number of the semiconductor light-emitting elements 20*a* is not particularly limited. For example, the resolution of the light source unit 20 (in other words, the number of the semiconductor light-emitting elements 20*a*) ranges from 1,000 to 300,000 pixels. In the light source unit 20 according to the present embodiment, 256-wide×64-high semiconductor light-emitting elements 20*a* are arrayed, correspondingly to a vehicle-width direction and a height direction of the light-distribution pattern, respectively. Moreover, in FIG. 2, of all the individual regions R corresponding to the individual semiconductor light-emitting elements 20*a*, some individual regions R are depicted for convenience of description.

Light ejected from the light source unit 20 advances forward of the lamp via the optical system and is shone at each individual region R corresponding to each semiconductor light-emitting element 20*a*. Thus, a light-distribution pattern in a predetermined shape is formed ahead of the lamp. For example, a light-distribution pattern made up of the individual regions R shown in FIG. 2 functions as a high-beam light-distribution pattern PH.

The image capturing unit 22 is a device that captures an image of a view ahead of the own vehicle. The image capturing unit 22 includes a camera 38. The camera 38 captures an image of all the individual regions R.

The controller 50 includes a luminance analysis section 42, a target analysis section 44, a lamp control section 46, and a light source control section 48. Image data acquired by the image capturing unit 22 is transmitted to the luminance analysis section 42 and the target analysis section 44.

The luminance analysis section 42 detects luminance for each individual region, based on information (image data) acquired from the image capturing unit 22. The luminance analysis section 42 is a high-speed low-accuracy analysis section that performs image analysis with lower accuracy and outputs a result of the analysis at higher speed, compared to the target analysis section 44. The luminance analysis section 42 in the present embodiment detects the luminance for each individual region, based on information acquired from the camera 38. The luminance analysis section 42 detects the luminance for each individual region R, for example, every 0.1 ms to 5 ms. A signal indicating a result of the detection by the luminance analysis section 42, that is, luminance information on the individual regions is transmitted to the lamp control section 46.

The target analysis section 44 detects a target present ahead of the own vehicle, based on information acquired from the image capturing unit 22. The target analysis section 44 is a low-speed high-accuracy analysis section that performs image analysis with higher accuracy and outputs a result of the analysis at lower speed, compared to the luminance analysis section 42. The target analysis section 44 in the present embodiment detects the target, based on information acquired from the camera 38. The target analysis section 44 detects the target, for example, every 50 ms. For targets detected by the target analysis section 44, vehicles ahead traveling ahead of the own vehicle (preceding vehicles traveling in the own travel lane, and oncoming vehicles traveling in an opposite lane), pedestrians, and the like are cited as examples. Obstacles, road signs, road markings, road shapes, and the like that interfere with traveling of the own vehicle are also included among targets.

The target analysis section 44 can detect the target by using a conventionally well-known method, including algorithm recognition, deep learning, and the like. For example, the target analysis section 44 retains beforehand a feature point indicating a preceding vehicle 100. When data including a feature point indicating a vehicle ahead is present in captured image data from the camera 38, the target analysis section 44 recognizes the position of the vehicle ahead. The "feature point indicating a vehicle ahead" is, for example, a light spot having a predetermined luminous intensity or more that appears in a region where a taillight of a preceding vehicle is estimated to be present. Alternatively, the "feature point indicating a vehicle ahead" is a light spot having a predetermined luminous intensity or more that appears in a region where a headlamp of an oncoming vehicle is estimated to be present. Similarly, the target analysis section 44 retains beforehand feature points of a pedestrian and other targets and, when data including any of the feature points is present in captured image data from the camera 38, recognizes the position of a target corresponding to the feature point. A signal indicating a result of the detection by the target analysis section 44, that is, information on the target ahead of the own vehicle is transmitted to the lamp control section 46.

The lamp control section 46, by using the result of the detection by the luminance analysis section 42 and/or the result of the detection by the target analysis section 44, performs: determination of a specific target; detection of a displacement of the specific target; setting of a specific individual region; setting of a target luminance value for each individual region, including a specific target luminance value for the specific individual region; setting of an illuminance value of light to be shone at each individual region; and the like. As an example, the lamp control section 46 includes a tracking part 52, a storage part 53, and an illuminance setting part 54. In the storage part 53, programs needed to perform various light distribution controls, vehicle ahead position prediction control, which will be described later, and the like are stored in memory. The tracking part 52 determines a specific target among targets detected by the target analysis section 44. The tracking part 52 detects a displacement of the specific target, based on the result of the detection by the luminance analysis section 42. In the present embodiment, a preceding vehicle is the specific target as an example.

Specifically, the tracking part 52 consolidates the result of the detection by the luminance analysis section 42 and the result of the detection by the target analysis section 44. Among the luminances for each individual region detected by the luminance analysis section 42, the luminance for an individual region R in which a light spot 102 of the preceding vehicle 100 that is the specific target is located is associated with the preceding vehicle 100. The tracking part 52 can detect a displacement of the preceding vehicle 100 that is the specific target by recognizing the position of the luminance associated with the preceding vehicle 100, in a result of detection by the luminance analysis section 42 that is acquired thereafter. The tracking part 52 performs a process of determining the specific target, for example, every 50 ms. The tracking part 52 performs a process of detecting a displacement (tracking) of the specific target, for example, every 0.1 ms to 5 ms.

The illuminance setting part 54, based on the result of the detection by the luminance analysis section 42 and a result of the detection by the tracking part 52, determines an illuminance value of light to be shone at each individual region, including a specific illuminance value for the specific individual region that is determined depending on a position where the specific target is present. For example, the illuminance setting part 54 determines a target luminance value for each individual region, and an illuminance value according to the target luminance value of light to be shone at each individual region. For the specific individual region among the individual regions, the specific target luminance value is determined. Accordingly, the specific illuminance value is an illuminance value determined depending on the specific target luminance value.

First, the illuminance setting part 54 determines a specific individual region R1, based on a position where the preceding vehicle 100 that is the specific target is present. For example, the illuminance setting part 54 determines the specific individual region R1, based on position information on the preceding vehicle 100 included in the result of the detection by the tracking part 52. Regarding setting of the specific individual region R1, for example, the illuminance setting part 54 determines a vertical-direction distance "b" having a predetermined aspect ratio, which is preset, with respect to a horizontal-direction distance "a" between two light spots 102 corresponding to the tail lamps of the preceding vehicle 100 (see FIG. 2), and sets an individual region R that overlaps a dimensional range of "a" wide×"b" high as the specific individual region R1 (see FIG. 2). The specific individual region R1 includes the individual region R that overlaps the driver of the preceding vehicle.

Then, the illuminance setting part 54 determines the specific target luminance value for the specific individual region R1. The illuminance setting part 54 also determines the target luminance values for the other individual regions R excluding the specific individual region R1. For example, the illuminance setting part 54 sets the target luminance values to the same value, with regard to those individual regions R for which the luminance detected by the luminance analysis section 42 falls in a predetermined range, among the individual regions R excluding the specific individual region R1. In other words, luminance equalization control is performed.

The illuminance setting part 54 recognizes a displacement of the specific individual region R1, based on the result of the detection by the tracking part 52, and updates position information on the specific individual region R1. Then, the target luminance value for each individual region R, including the specific target luminance value for the specific individual region R1, is updated. The process by the tracking part 52 and the process by the illuminance setting part 54 are executed in parallel at least for a time.

The illuminance setting part 54 determines the illuminance value of light to be shone at each individual region R from the light source unit 20, based on the target luminance value for each individual region R and the result of the detection by the luminance analysis section 42. The illuminance setting part 54 transmits a signal indicating the illuminance value of each individual region R to the light source control section 48. The illuminance setting part 54 sets the target luminance values and the illuminance values, for example, every 0.1 ms to 5 ms.

Note that the illuminance setting part 54 may change the target luminance values, according to brightness around the own vehicle or the like. In other words, the target luminance values are determined in such a manner that optimal brightness is created ahead of the own vehicle, in each of an urban area and a suburban area, or during the day, at dusk, and at night each. The illuminance setting part 54 may vary the target luminance values for the individual regions R other than the specific individual region R1.

The light source control section 48 controls the light source unit 20, based on the illuminance values determined by the illuminance setting part 54. The light source control section 48 controls turning on and off of the semiconductor light-emitting elements 20*a*. The light source control section 48 may adjust a ratio (width or density) of time for which each semiconductor light-emitting element 20*a* is turned on, based on the illuminance value of light to be shone at each individual region R. Thus, the illuminance of light shone at each individual region R can be adjusted.

Light is shone from the light source unit 20, based on the illuminance values determined by the illuminance setting part 54, and an actual luminance value for each individual region R as a result thereof is detected by the luminance analysis section 42. Then, based on a result of the detection, the illuminance setting part 54 sets illuminance values again.

With the configuration described above, the vehicle lamp system 10 can form a light-distribution pattern configured by a plurality of partial illuminated regions (the individual regions R) gathering. Each of the partial illuminated regions is formed when the corresponding semiconductor light-emitting element 20*a* is turned on. The vehicle lamp system 10 can form light-distribution patterns in various shapes by switching each semiconductor light-emitting element 20*a* between on and off.

The vehicle lamp system 10 performs adaptive driving beam (ADB) control of forming an optimal light-distribution pattern, according to the position of the specific target ahead of the own vehicle. As an example, the illuminance setting part 54 sets a specific target luminance value of "0" for the specific individual region R1 determined according to a position where the preceding vehicle 100 is present, and sets a target luminance value of "1" for the other individual regions R. The settings are assumed to be first luminance information. Moreover, the illuminance setting part 54 sets a target luminance value of "2" for all individual regions R, pursuant to the luminance equalization control. The setting is assumed to be second luminance information. Then, the illuminance setting part 54 performs an AND operation of the first luminance information and the second luminance information. Thus, luminance information is generated in which the specific target luminance value for the specific individual region R1 is "0", and the target luminance values for the other individual regions R are "2".

The illuminance setting part 54 sets the specific illuminance value to "0", for the specific individual region R1 for which the specific target luminance value is "0". In other words, light is blocked (a state of illuminating is restricted) for the specific individual region R1. Among the individual regions R excluding the specific individual region R1, the luminance for an individual region R in which an object that itself emits light is present, such as a street light, does not deviate from the target luminance value, or is the target luminance value or more. Accordingly, for such an individual region R, the illuminance setting part 54 sets the illuminance value to "0" to block light. Moreover, for the luminance of an individual region R in which an object having a high reflectance is present, such as a road sign, a delineator, or a reflecting plate, since deviation of the luminance from the target luminance value is little compared to the other individual regions R, a relatively low illuminance value is set. In other words, light is reduced for such an individual region R. A light-distribution pattern in which the illuminance of each region is thus determined is formed ahead of the own vehicle, whereby the driver of the preceding vehicle 100 is not exposed to shining of light, and the individual regions R excluding the specific individual region R1 have the same brightness when seen from the driver of the own vehicle or the image capturing unit 22.

Note that light being blocked (a state of illuminating being restricted) for the specific individual region includes a case where light is blocked in such a manner that light is not shone at the region at all, as well as a case where the amount of light to be shone is made smaller than before, or light is reduced, such as a ratio of turning-on of light being made smaller when turning-on and turning-off of light are repeated at a constant frequency (for example, PWM dimming).

Figure 3:
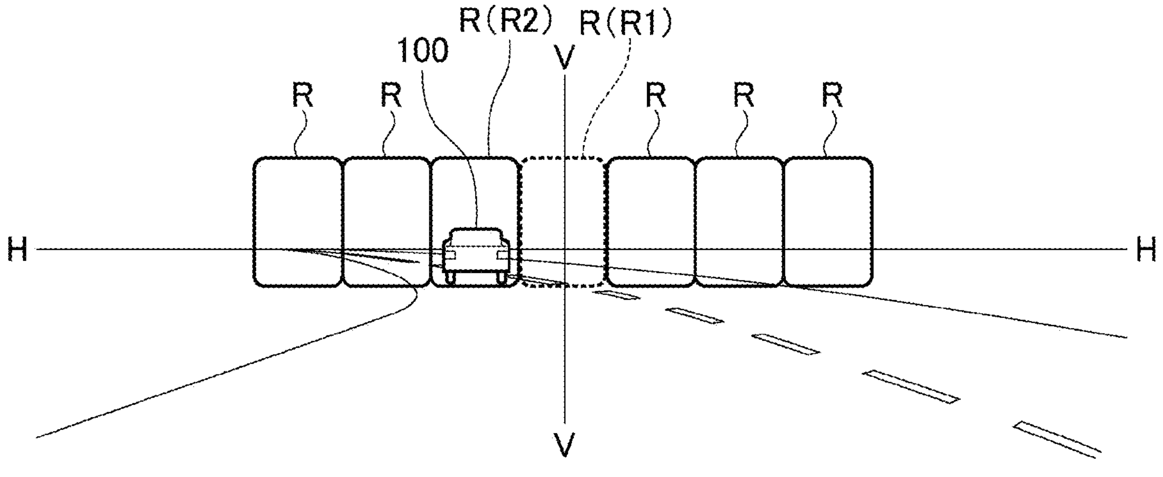
FIG. 3 is a diagram schematically showing a view in which a preceding vehicle enters a curve from the state shown in FIG. 2.

Next, a description is given of light distribution control in a case where the preceding vehicle 100 traveling directly in front of the own vehicle as shown in FIG. 2 enters a curve. FIG. 3 is a diagram schematically showing a view in which the preceding vehicle enters a curve from the state shown in FIG. 2. Generally, a delay of approximately 100 ms to 200 ms occurs until an image ahead of the own vehicle image is captured by the capturing unit 22, a target is detected from acquired image data by the controller 50, and an area ahead of the own vehicle where the preceding vehicle 100 is present is illuminated by a desired light-distribution pattern through control of the light source unit 20 by the light source control section 48.

Accordingly, as shown in FIG. 3, even if the preceding vehicle 100 enters a curve, it is not immediately possible to perform light blocking control targeting an individual region R2 to the left of the specific individual region R1 for which light has been blocked. Accordingly, there is a possibility that glare is given to an occupant (driver or passenger) of the preceding vehicle 100. Accordingly, prediction control is conceivable in which the position of the preceding vehicle 100 after a predetermined time period (for example, after 200 ms) is calculated from the earlier movement of the preceding vehicle 100 (an amount of movement of the detection angle of the camera, or an amount of change in coordinates of the target on image data), and light is blocked for a specific individual region that includes the position.

Figure 4:
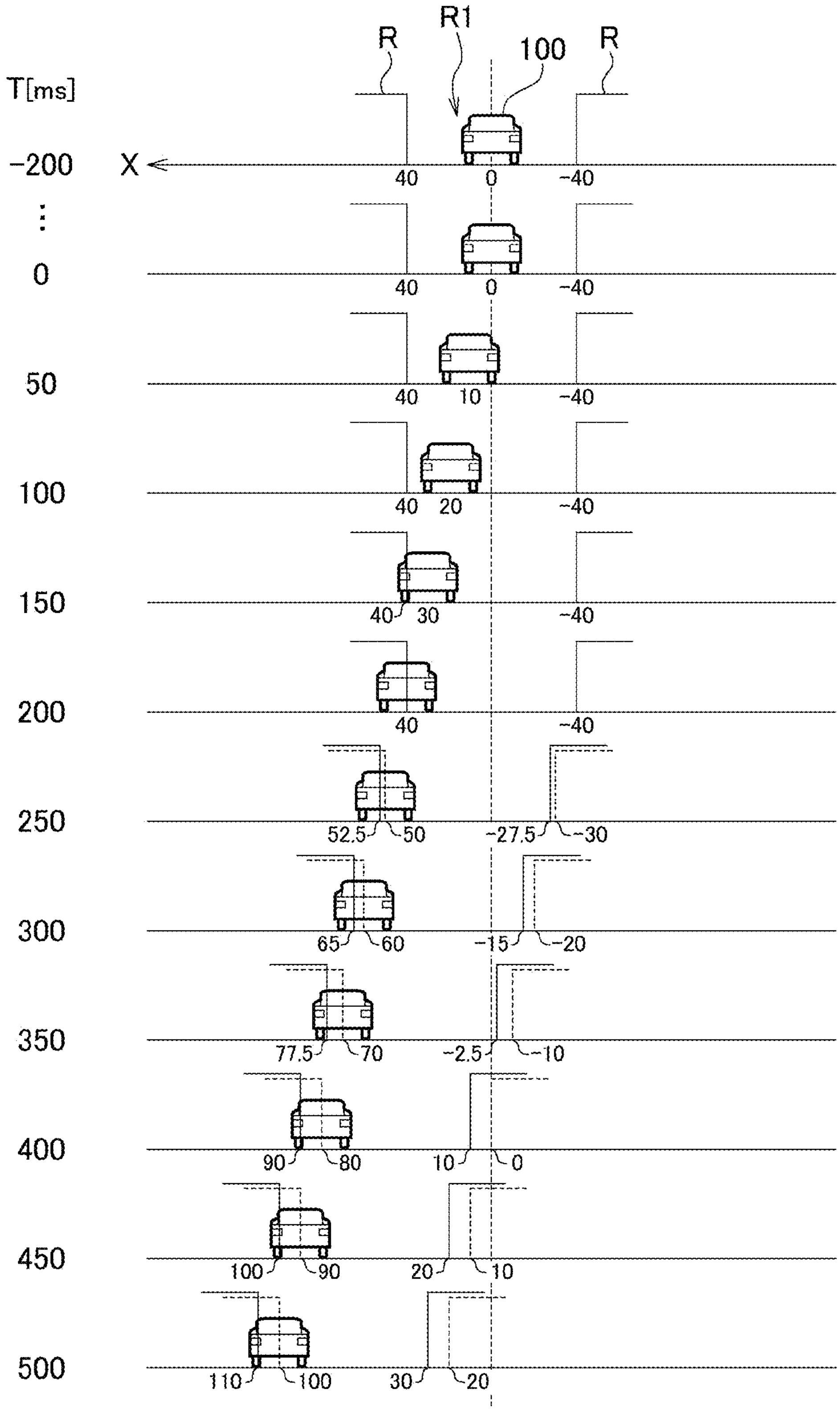
FIG. 4 is a schematic diagram showing an example of prediction control for blocking light to the preceding vehicle when the preceding vehicle enters the curve.

FIG. 4 is a schematic diagram showing an example of the prediction control for blocking light to the preceding vehicle when the preceding vehicle enters the curve. FIG. 4 shows a case where the preceding vehicle 100 located directly in front of the own vehicle traveled a straight road at least for a past period of 200 ms before reference time 0. Moreover, for convenience of description, the position of the preceding vehicle is indicted by an X coordinate, assuming that an X direction on the left side of zero as the center is positive. In such a case, at time T=0 [ms] (hereinafter, shortened by omission, such as T=0), the center coordinate of the preceding vehicle 100 is X=0, and the average of movements in past 200 ms (the average of four X coordinates acquired every 50 ms) is zero.

The following description illustrates an example in which the preceding vehicle 100 that has entered the curve moves by 10 in the positive direction of X coordinates every 50 ms. Moreover, although the size (light-blocking range) in the X direction of one specific individual region R1 is 80 in terms of X-coordinate units, the value is used for convenience, and an actual size may be selected as appropriate. Moreover, in place of coordinates, detection angles of the camera may be used.

The specific individual region R1 (X=40 to −40) calculated based on image data obtained by the image capturing unit 22 capturing the preceding vehicle 100 in such a state is reflected at a time point of T=200, with a system delay of 200 ms taken into account. Accordingly, the position of the specific individual region R1 is unchanged during a period between T=0 to 200, so that there is a possibility that glare is given to an occupant of the preceding vehicle 100 during a period between T=150 to 200 as shown in FIG. 4.

Next, at a time point of T=50, the preceding vehicle 100 moves in the X direction (X=10) by entering the curve, and the average of movements in past 200 ms between T=−150 to 50 is 2.5. Accordingly, the predicted coordinate of the preceding vehicle at T=250 after a system delay of 200 ms is X=12.5, and the specific individual region R1 is in a range of X=12.5±40.

Next, at a time point of T=100, the preceding vehicle 100 further moves in the X direction (X=20), and the average of movements in past 200 ms between T=−100 to 100 is five. Accordingly, the predicted coordinate of the preceding vehicle at T=300 after a system delay of 200 ms is X=25, and the specific individual region R1 is in a range of X=25±40.

Next, at a time point of T=150, the preceding vehicle 100 further moves in the X direction (X=30), and the average of movements in past 200 ms between T=−50 to 150 is 7.5. Accordingly, the predicted coordinate of the preceding vehicle at T=350 after a system delay of 200 ms is X=37.5, and the specific individual region R1 is in a range of X=37.5±40.

Next, at a time point of T=200, the preceding vehicle 100 further moves in the X direction (X=40), and the average of movements in past 200 ms between T=0 to 200 is 10. Accordingly, the predicted coordinate of the preceding vehicle at T=400 after a system delay of 200 ms is X=50, and the specific individual region R1 is in a range of X=50±40.

Next, at a time point of T=250, the preceding vehicle 100 further moves in the X direction (X=50), and the average of movements in past 200 ms between T=50 to 250 is 10. Accordingly, the predicted coordinate of the preceding vehicle at T=450 after a system delay of 200 ms is X=60, and the specific individual region R1 is in a range of X=60±40.

Next, at a time point of T=300, the preceding vehicle 100 further moves in the X direction (X=60), and the average of movements in past 200 ms between T=100 to 300 is 10. Accordingly, the predicted coordinate of the preceding vehicle at T=500 after a system delay of 200 ms is X=70, and the specific individual region R1 is in a range of X=70±40.

In contrast to the above control, a case is described where light blocking control for the preceding vehicle at the time the preceding vehicle enters the curve is performed solely based on position information on the preceding vehicle at the reference time. In such a case, as shown in FIG. 4, since the position information on the preceding vehicle acquired at T=50, at which the preceding vehicle starts entering the curve, is X=10, the specific individual region R1 that is optimal when the position of the preceding vehicle is X=10 is calculated as X=10±40. However, a timing of illuminating the front based on the calculated condition is after a system delay of 200 ms, which is T=250. Accordingly, the specific individual region R1 at T=250 is X=10±40 (dotted lines in FIG. 4).

Similarly, the specific individual region R1 calculated based on the position information on the preceding vehicle acquired at T=100 is 20±40, and a timing of illuminating the front based on the calculated condition is after a system delay 200 ms, which is T=300. Accordingly, the specific individual region R1 at T=300 is X=20±40 (dotted lines in FIG. 4).

Similarly, the specific individual region R1 at T=350 is X=30±40, the specific individual region R1 at T=400 is X=40±40, the specific individual region R1 at T=450 is X=50±40, and the specific individual region R1 at T=500 is X=60±40 (dotted lines in FIG. 4).

Accordingly, by determining the specific individual regions R1 indicated by solid lines in FIG. 4 through the prediction control, accuracy of the following behavior of light blocking when the preceding vehicle enters a curve is enhanced, compared to the case where the prediction control is not performed and the specific individual regions R1 indicated by dotted lines in FIG. 4 are determined.

As a result of further study based on the findings described above, the inventors of the present application have come up with the idea that higher-accuracy following behavior of light blocking can be realized by calculating a predicted position to which a vehicle ahead that is the control target is predicted to move after a fixed time period from predetermined reference time (T [ms]=0, 50, 100, . . . ), based on position information on the vehicle ahead that is acquired anew at the reference time, an amount of change in position of the vehicle ahead calculated from a plurality of pieces of position information that is acquired during a predetermined time period before the reference time, and information on a travel road (a curve or a straight road) on which the vehicle ahead travels.

First, a method of determining whether the travel road is a curve (a straight road) is described. When a taillight of the preceding vehicle 100 is detected as a feature point by the target analysis section 44 as described above, the tracking part 52 consecutively detects displacements of the taillight. Note that for simplicity of description, displacements of the right and left lamps of taillights are handled collectively, not individually, as those of a whole light spot. Moreover, for a displacement, coordinates in a horizontal direction (X direction: positive on the left) ahead of the vehicle are solely used, and an X1 coordinate calculated from information acquired by the image capturing unit 22 for a current time and an X0 coordinate calculated from information acquired by the image capturing unit 22 for a previous time are compared. Note that coordinate detection is performed, for example, every 50 ms.

When X1>X0, one is added to the number of counts for a left-curve count LC, and the number of counts for a right-curve count RC is reset. Conversesly, when X1<X0, the number of counts for the left-curve count LC is reset, and one is added to the number of counts for the right-curve count RC. Such processes are repeated, and when the number of counts for LC or RC is a predetermined value or larger (for example, three or larger), it is determined that the travel road on which the vehicle ahead travels is a curve. When the number of counts for LC or RC is a predetermined value or smaller (for example, two or smaller), it is determined that the travel road on which the vehicle ahead travels is a straight road. A result determined here contributes to enhancement of accuracy of the following behavior of light blocking in prediction control that is described below.

Next, an outline of the prediction control according to the present embodiment is described. A predicted coordinate X in the present embodiment is represented by the following expressions (1) to (3).

$$\text{Predicted coordinate } X = (\text{target's coordinate\_amount of change during } t\,[\text{ms}]) \times \text{prediction coefficient } \alpha + \text{current (reference time) input coordinate} \quad \text{expression (1)}$$

$$\text{Target's coordinate\_amount of change during } t\,[\text{ms}] = \sum(\text{amount of change in target's coordinate during } 50\,[\text{ms}]) \quad \text{expression (2)}$$

$$\text{Amount of change in target's coordinate during } 50\,[\text{ms}] = \text{current input coordinate} - \text{previous input coordinate} \quad \text{expression (3)}$$

Figure 5:
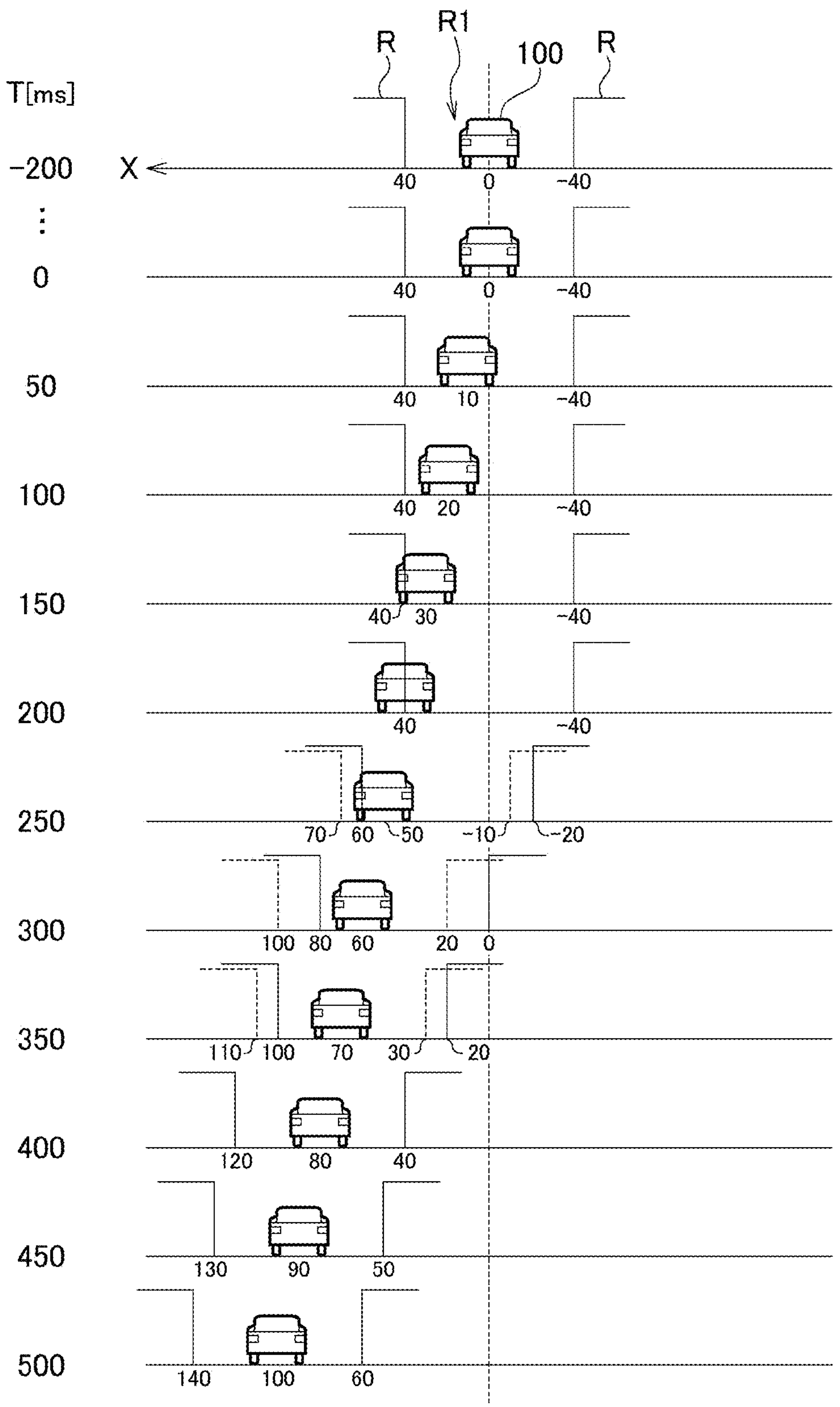
FIG. 5 is a schematic diagram for describing prediction control according to the present embodiment.

FIG. 5 is a schematic diagram for describing the prediction control according to the present embodiment. FIG. 5 shows a case, as in FIG. 4, where the preceding vehicle 100 located directly in front of the own vehicle traveled a straight road at least for a past period of 200 ms before reference time 0. Moreover, as in FIG. 4, the position of the preceding vehicle is indicted by an X coordinate, assuming that an X direction on the left side of zero as the center is positive. In such a case, at T=0, the center coordinate of the preceding vehicle 100 is X=0, and the amount of change in past 200 ms (four amounts of change in X coordinate, each acquired every 50 ms) is zero. Other conditions and matters that are not particularly mentioned below are similar to those described in FIG. 4.

As shown in FIG. 5, the specific individual region R1 (X=40 to −40) calculated based on image data obtained by the image capturing unit 22 capturing the preceding vehicle 100 is reflected at a time point of T=200, with a system delay of 200 ms taken into account. Accordingly, the position of the specific individual region R1 is unchanged during a period between T=0 to 200.

Next, at a time point of T=50, the preceding vehicle 100 moves in the X direction (X=10) by entering a curve, and the amount of change in coordinate of the target (the result of summation in every 50 ms) in past 200 ms between T=−150 to 50 is 10. Additionally, in the following, one is used for a prediction coefficient according to the curve. Accordingly, the predicted coordinate of the preceding vehicle at time T=250 after a system delay of 200 ms is X=10 (amount of change in target's coordinate during 200 ms)×1 (prediction coefficient)+10 (current input coordinate)=20, and the specific individual region R1 is in a range of X=20±40.

Next, at a time point of time T=100, the preceding vehicle 100 further moves in the X direction (X=20), and the amount of change in coordinate of the target in past 200 ms between T=−100 to 100 is 20. Accordingly, the predicted coordinate of the preceding vehicle at T=300 after a system delay of 200 ms is X=20 (amount of change in target's coordinate during 200 ms)×1 (prediction coefficient)+20 (current input coordinate)=40, and the specific individual region R1 is in a range of X=40±40.

Next, at a time point of T=150, the preceding vehicle 100 further moves in the X direction (X=30), and the amount of change in coordinate of the target in past 200 ms between T=−50 to 150 is 30. Accordingly, the predicted coordinate of the preceding vehicle at T=350 after a system delay of 200 ms is X=30 (amount of change in target's coordinate during 200 ms)×1 (prediction coefficient)+30 (current input coordinate)=60, and the specific individual region R1 is in a range of X=60±40.

Next, at a time point of T=200, the preceding vehicle 100 further moves in the X direction (X=40), and the amount of change in coordinate of the target in past 200 ms between T=0 to 200 is 40. Accordingly, the predicted coordinate of the preceding vehicle at T=400 after a system delay of 200 ms is X=40 (amount of change in target's coordinate during 200 ms)×1 (prediction coefficient)+40 (current input coordinate)=80, and the specific individual region R1 is in a range of X=80±40.

Next, at a time point of T=250, the preceding vehicle 100 further moves in the X direction (X=50), and the amount of change in coordinate of the target in past 200 ms between T=50 to 250 is 40. Accordingly, the predicted coordinate of the preceding vehicle at T=450 after a system delay of 200 ms is X=40 (amount of change in target's coordinate during 200 ms)×1 (prediction coefficient)+50 (current input coordinate)=90, and the specific individual region R1 is in a range of X=90±40.

Next, at a time point of T=300, the preceding vehicle 100 further moves in the X direction (X=60), and the amount of change in coordinate of the target in past 200 ms between T=100 to 300 is 40. Accordingly, the predicted coordinate of the preceding vehicle at T=500 after a system delay of 200 ms is X=40 (amount of change in target's coordinate during 200 ms)×1 (prediction coefficient)+60 (current input coordinate)=100, and the specific individual region R1 is in a range of X=100±40.

When a result of the following behavior of light blocking through the prediction control according to the present embodiment described above is compared to a result of the following behavior of light blocking indicated by solid lines in FIG. 4, it can be seen that through the prediction control according to the present embodiment, the preceding vehicle 100 is included almost entirely in the specific individual region R1 at and after T=250, and glare given to an occupant of the preceding vehicle 100 is restricted.

On the other hand, since the amount of change in coordinate of the target in past 200 ms is used in the calculation of a predicted coordinate, the predicted coordinate based on the current input coordinate at T=50 that is of the preceding vehicle immediately after entering the curve is greatly affected by the coordinate (X=0) of the preceding vehicle on the straight road during T=−150 to 0. In other words, before T=200, the impact of the past coordinates of the preceding vehicle on the straight road remains. Accordingly, there is room for improvement in calculation of the specific individual region R1 at T=250 to 400 after a system delay of 200 ms.

Accordingly, by changing a time period for summation of amounts of change in coordinate of the target from past 200 ms to past 100 ms after a curve is determined through the above-described travel road determination method, it is possible to further enhance accuracy of the following behavior of light blocking. Note that the determination of a curve is not limited to through the above-described method, and it may be determined whether the preceding vehicle has entered (is going to enter) a curve, based on image data on a view ahead captured by the camera, or information from the GPS or the like.

Calculation of a predicted coordinate in such a case may be complemented, specifically, by adding up an amount of change in X coordinate (X1−X0) acquired every 50 ms in past 100 ms, and using the same acquired sample twice, given that the number of acquired samples has changed from previous four (200/50) to two (100/50). Alternatively, the amount of change in X coordinate may be acquired every 25 ms such that four samples are acquired. Using FIG. 5, a description is given of control of changing the time period for summation after a curve is determined.

As shown in FIG. 5, at a time point of T=50, the preceding vehicle 100 moves in the X direction (X=10) by entering the curve, and the amount of change in coordinate of the target in past 100 ms between T=−50 to 50 ((result of summation in every 50 ms)× 2) is 20. Additionally, in the following, one is used for a prediction coefficient according to the curve. Accordingly, the predicted coordinate of the preceding vehicle at T=250 after a system delay of 200 ms is X=20 (amount of change in target's coordinate during 100 ms)× 1 (prediction coefficient)+10 (current input coordinate)=30, and the specific individual region R1 is in a range of X=30±40 (dotted lines in FIG. 5).

Next, at a time point of T=100, the preceding vehicle 100 further moves in the X direction (X=20), and the amount of change in coordinate of the target in past 100 ms between T=0 to 100 is 40. Accordingly, the predicted coordinate of the preceding vehicle at T=300 after a system delay of 200 ms is X=40 (amount of change in target's coordinate during 100 ms)×1 (prediction coefficient)+20 (current input coordinate)=60, and the specific individual region R1 is in a range of X=60±40 (dotted lines in FIG. 5).

Next, at a time point of T=150, the preceding vehicle 100 further moves in the X direction (X=30), and the amount of change in coordinate of the target in past 100 ms between T=50 to 150 is 40. Accordingly, the predicted coordinate of the preceding vehicle at T=350 after a system delay of 200 ms is X=40 (amount of change in target's coordinate during 100 ms)×1 (prediction coefficient)+30 (current input coordinate)=70, and the specific individual region R1 is in a range of X=70±40 (dotted lines in FIG. 5).

Next, at a time point of T=200, the preceding vehicle 100 further moves in the X direction (X=40), and the amount of change in coordinate of the target in past 100 ms between T=100 to 200 is 40. Accordingly, the predicted coordinate of the preceding vehicle at T=400 after a system delay of 200 ms is X=40 (amount of change in target's coordinate during 100 ms)×1 (prediction coefficient)+40 (current input coordinate)=80, and the specific individual region R1 is in a range of X=80±40. At time T thereafter, the same applies as the specific individual region R1 indicated by solid lines in FIG. 5.

As described above, while the preceding vehicle travels on a curve, the time period for summation in the calculation of a predicted coordinate is made shorter than the time period for summation while the preceding vehicle travels on a straight road, whereby it is possible to enhance responsiveness of the following behavior of light blocking.

Figure 6:
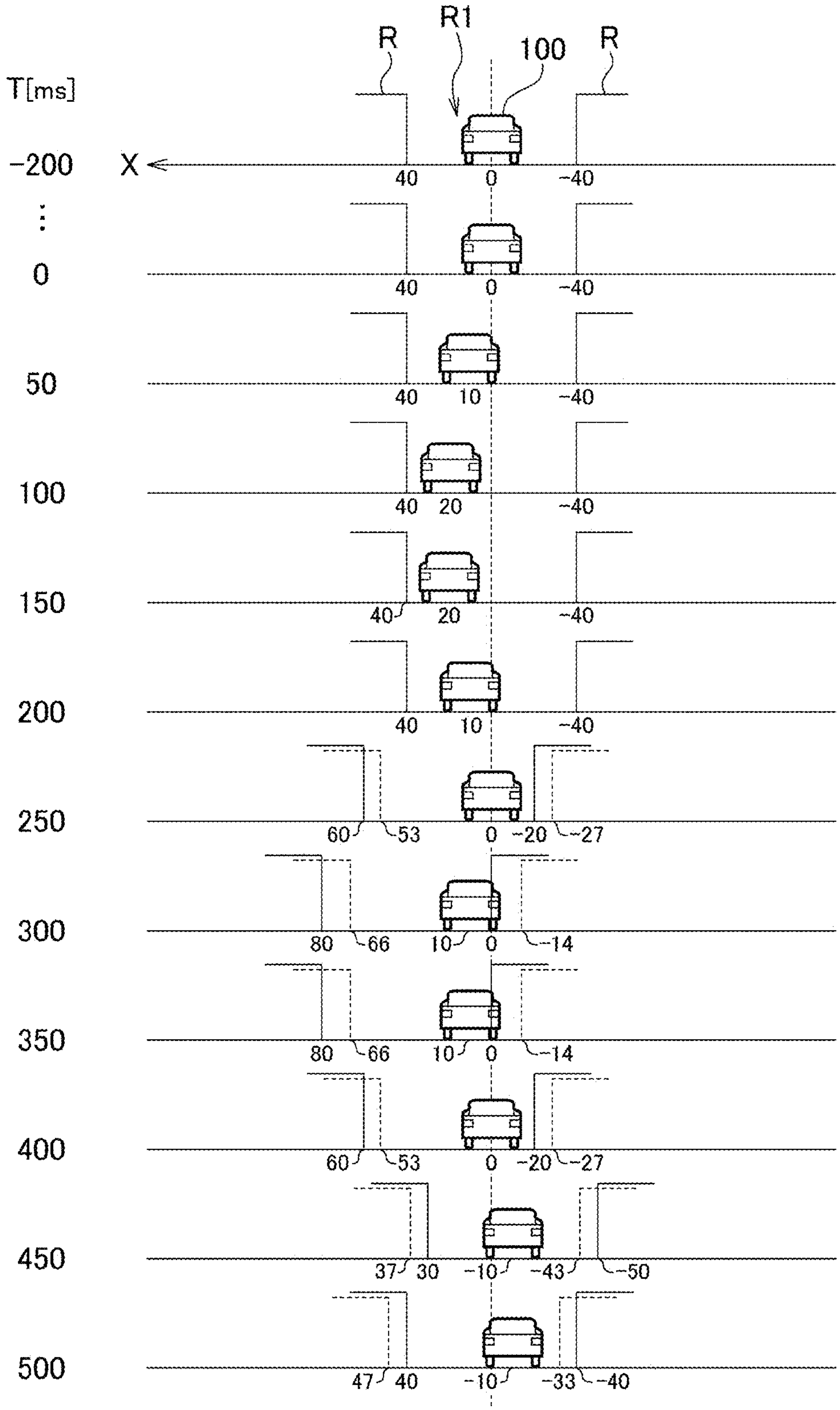
FIG. 6 is a schematic diagram for describing another example of the prediction control according to the present embodiment.

Next, prediction control while the preceding vehicle travels on a straight road is described. FIG. 6 is a schematic diagram for describing another example of the prediction control according to the present embodiment. FIG. 6 shows a case, as in FIG. 4, where the preceding vehicle 100 located directly in front of the own vehicle traveled a straight road at least for a past period of 200 ms before reference time 0. Moreover, as in FIG. 4, the position of the preceding vehicle is indicted by an X coordinate, assuming that an X direction on the left side of zero as the center is positive. In such a case, at T=0, the center coordinate of the preceding vehicle 100 is X=0, and the amount of change in past 200 ms (four amounts of change in X coordinates, each acquired every 50 ms) is zero. Other conditions and matters that are not particularly mentioned below are similar to those described in FIG. 4.

As shown in FIG. 6, the specific individual region R1 (X=40 to −40) calculated based on image data obtained by the image capturing unit 22 capturing the preceding vehicle 100 is reflected at a time point of T=200, with a system delay of 200 ms taken into account. Accordingly, the position of the specific individual region R1 is unchanged during a period between T=0 to 200.

Next, at a time point of T=50, the preceding vehicle 100 moves in the X direction (X=10) by snaking its way through a very gentle curve or a straight road, and the amount of change in coordinate of the target (the result of summation in every 50 ms) in past 200 ms between T=−150 to 50 is 10. Additionally, in the following, one is used for a prediction coefficient. Accordingly, the predicted coordinate of the preceding vehicle at T=250 after a system delay of 200 ms is X=10 (amount of change in target's coordinate during 200 ms)× 1 (prediction coefficient)+10 (current input coordinate) =20, and the specific individual region R1 is in a range of X=20±40.

Next, at a time point of T=100, the preceding vehicle 100 further moves in the X direction (X=20), and the amount of change in coordinate of the target in past 200 ms between T=−100 to 100 is 20. Accordingly, the predicted coordinate of the preceding vehicle at T=300 after a system delay of 200 ms is X=20 (amount of change in target's coordinate during 200 ms)×1 (prediction coefficient)+20 (current input coordinate)=40, and the specific individual region R1 is in a range of X=40±40.

Next, at a time point of T=150, the preceding vehicle 100 does not move in the X direction (X=20), and the amount of change in coordinate of the target in past 200 ms between T=−50 to 150 is 20. Accordingly, the predicted coordinate of the preceding vehicle at T=350 after a system delay of 200 ms is X=20 (amount of change in target's coordinate during 200 ms)×1 (prediction coefficient)+20 (current input coordinate)=40, and the specific individual region R1 is in a range of X=40±40.

Next, at a time point of T=200, the preceding vehicle 100 moves in a −X direction (X=10), and the amount of change in coordinate of the target in past 200 ms between T=0 to 200 is 10. Accordingly, the predicted coordinate of the preceding vehicle at T=400 after a system delay of 200 ms is X=10 (amount of change in target's coordinate during 200 ms)×1 (prediction coefficient)+10 (current input coordinate) =20, and the specific individual region R1 is in a range of X=20±40.

Next, at a time point of T=250, the preceding vehicle 100 further moves in the −X direction (X=0), and the amount of change in coordinate of the target in past 200 ms between T=50 to 250 is −10. Accordingly, the predicted coordinate of the preceding vehicle at T=450 after a system delay of 200 ms is X=−10 (amount of change in target's coordinate during 200 ms)×1 (prediction coefficient)+0 (current input coordinate)=−10, and the specific individual region R1 is in a range of X=−10±40.

Next, at a time point of T=300, the preceding vehicle 100 moves in the X direction (X=10), and the amount of change in coordinate of the target in past 200 ms between T=100 to 300 is −10. Accordingly, the predicted coordinate of the preceding vehicle at T=500 after a system delay of 200 ms is X=−10 (amount of change in target's coordinate during 200 ms)×1 (prediction coefficient)+10 (current input coordinate)=0, and the specific individual region R1 is in a range of X=0±40.

According to the following behavior of light blocking through the prediction control according to the present embodiment described above, the preceding vehicle 100 is included almost entirely in the specific individual regions R1. However, right-left movements of the specific individual region R1 are great, compared to right-left movements of the preceding vehicle 100, and there is therefore a possibility that the prediction control for the following behavior of light blocking is excessive.

Accordingly, by making the prediction coefficient smaller when it is determined that the travel road is not a curve (is a straight road) through the above-described travel road determination method, it is possible to lessen the impact of the prediction control for the following behavior of light blocking. Specifically, 0.3 is used for a prediction coefficient.

In such a case, the predicted coordinate of the preceding vehicle at T=250 after a system delay of 200 ms is X=10 (amount of change in target's coordinate during 200 ms)×0.3 (prediction coefficient)+10 (current input coordinate)=13, and the specific individual region R1 is in a range of X=13±40.

Through similar computation, the predicted coordinate of the preceding vehicle at T=300 is X=26, and the specific individual region R1 is in a range of X=26±40. The predicted coordinate of the preceding vehicle at T=350 is X=26, and the specific individual region R1 is in a range of X=26±40. The predicted coordinate of the preceding vehicle at T=400 is X=13, and the specific individual region R1 is in a range of X=13±40. The predicted coordinate of the preceding vehicle at T=450 is X=−3, and the specific individual region R1 is in a range of X=−3±40. The predicted coordinate of the preceding vehicle at T=500 is X=7, and the specific individual region R1 is in a range of X=7±40.

As described above, while the preceding vehicle travels on a straight road, the prediction coefficient in the calculation of a predicted coordinate is made smaller than the prediction coefficient while the preceding vehicle travels on a curve, whereby it is possible to lessen responsiveness of the following behavior of light blocking. Thus, when the driver of the own vehicle drives while seeing ahead of the vehicle, discomfort felt due to quick movements of a light-blocked position (specific individual region R1) is reduced.

As described above, the vehicle lamp system 10 according to the present embodiment includes: the vehicle lamp 12 that is able to form the high-beam light-distribution pattern PH in which a state of illuminating one or some illuminated regions (specific individual region R1) is changed among a plurality of illuminated regions (individual regions R) that are separate in the vehicle-width direction ahead of the own vehicle; and the controller 50 that is able to control the vehicle lamp 12 in such a manner as to restrict the state of illuminating the one or some illuminated regions, based on position information (current input coordinate) having a correlation with the position of a vehicle ahead. Thus, it is possible to more accurately calculate a predicted position to which the vehicle ahead is predicted to move after a fixed time period from a reference time.

The controller 50 calculates a predicted position to which the vehicle ahead is predicted to move after a fixed time period (after a system delay of 200 ms) from a reference time, based on the position information (current input coordinate) that is acquired anew at the reference time, an amount of change in position of the vehicle ahead (current input coordinate-previous input coordinate) calculated from a plurality of pieces of the position information that is acquired during a predetermined time period (for example, 100 ms to 200 ms) before the reference time, and information (whether a curve or not) on a travel road on which the vehicle ahead travels.

Thus, it is possible to more accurately calculate the predicted position to which the vehicle ahead is predicted to move after the fixed time period from the reference time (for example, T=200, . . . ).

The controller 50 controls the illuminance setting part 54 in such a manner as to restrict the state of illuminating the one or some illuminated regions (specific individual region R1) including the predicted position. Thus, it is possible to restrict glare given to the driver of the vehicle ahead, according to the travel road on which the vehicle ahead travels.

The vehicle lamp 12 may include the light source unit 20 that is able to change a state of illuminating each of 100 or more illuminated regions (individual regions R) individually that are separate in the vehicle-width direction in the high-beam light-distribution pattern. In the case of the light-distribution pattern including 100 or more separate illumination regions in the vehicle-width direction, each illuminated region (individual region R) produces a high definition in many cases. Accordingly, when a region (individual region R2) where illumination should naturally be restricted as the preceding vehicle 100 moves is left in an illuminated state as shown in FIG. 3, the driver of the preceding vehicle 100 immediately feels glare. Accordingly, by accurately calculating the predicted position, it is possible to restrict glare given to the driver.

In the curve determination method, it is determined that the travel road is a curve when movement in the same direction occurs a predetermined number of times or more consecutively. However, a curve may be determined when the number of times a rightward or leftward displacement occurs is larger than a predetermined value. For example, the controller 50 may include: a counter that, in the predetermined time period before the reference time, counts the number of cases where a difference between the (i+1)-th (i=1 to n) position information on the vehicle ahead and the i-th position information on the vehicle ahead is a positive value and the number of cases where the difference is a negative value, individually; and a travel road determiner that determines whether the travel road on which the vehicle ahead travels is a curve, based on the number of counts C1 of the case where the difference is a positive value and the number of counts C2 of the case where the difference is a negative value. The travel road determiner may determine that the travel road is a curve when $|C1-C2|>A$ (A being a predetermined positive number). Thus, it is possible to determine whether the travel road is a curve, based on the difference between the (i+1)-th (i=1 to n) position information on the vehicle ahead and the i-th position information on the vehicle ahead.

The controller 50 varies, depending on whether the travel road is a curve, a weighting coefficient (prediction coefficient) of the amount of change in position used in the calculation of the predicted position. Thus, it is possible to calculate the predicted position according to the travel road.

In the controller 50, a weighting coefficient D1 (one in the present embodiment) of the amount of change in position used when $|C1-C2|>A$ (A being a predetermined positive number) (when a curve is determined) is greater than a weighting coefficient D2 (0.3 in the present embodiment) of the amount of change in position used when $|C1-C2|\leq A$ (when a straight road is determined). Thus, in a situation where the probability is high that the travel road is a curve, it is possible to enhance following performance in the control of restricting the state of illuminating the one or some regions including the predicted position.

In the controller 50, a predetermined time period T1 (100 ms in the present embodiment) used to calculate the amount of change in position when $|C1-C2|>A$ (A being a predetermined positive number) (when a curve is determined) is shorter than a predetermined time period T2 (200 ms in the present embodiment) used to calculate the amount of change in position when $|C1-C2|\leq A$ (when a straight road is determined). Thus, for example, in a situation where the travel road changes from a straight line into a curve, by decreasing the impact of an amount of change in position of the vehicle ahead at the time of traveling in a straight line and increasing the impact of an amount of change in position at the time of traveling on the curve, it is possible to enhance following performance in the control of restricting the state of illuminating the one or some regions including the predicted position.

An invention of control performed by the vehicle lamp system according to the present embodiment can be recognized as an invention of a control device or a control method. Moreover, such an invention of control can be recognized as an invention of a program to be executed by the controller and an invention of a computer-readable recording medium storing the program. The in-vehicle program for carrying out the present invention may be implemented in such a manner as to be updatable by over the air (OTA) via in-vehicle communication equipment or the like.

Although the present invention has been described by referring to the above-described embodiment, the present invention is not limited to the embodiment, and those made by combining components in the embodiment as appropriate and those made by using substitutions are also included in the present invention. Moreover, it is also possible to interchange the combinations and order of the processes in the embodiment as appropriate and to add modifications, such as various changes in design, to the embodiment based on knowledge of those skilled in the art, and embodiments with the addition of such modifications can be included in the scope of the present invention.

This international application claims priority to Japanese Patent Application No. 2022-146513 filed on Sep. 14, 2022, and the disclosure of Japanese Patent Application No. 2022-146513 is incorporated by reference herein in its entirety.

The above description as to specific embodiments of the present invention is provided for illustrative purposes. Such specific embodiments are not intended to be exhaustive, or to limit the present invention to the embodiments as stated. It would be obvious to those skilled in the art that a large number of modifications and changes can be made in view of the description above.

REFERENCE SIGNS LIST

10 vehicle lamp system
12 vehicle lamp
20 light source unit
22 image capturing unit
42 luminance analysis section
44 target analysis section
46 lamp control section
48 light source control section
50 controller
52 tracking part
54 illuminance setting part
100 preceding vehicle

The invention claimed is:

1. A vehicle lamp system comprising:

a vehicle lamp that is able to form a high-beam light-distribution pattern in which a state of illuminating one or some illuminated regions is changed among illuminated regions that are separate in a vehicle-width direction ahead of an own vehicle; and a controller that is able to control the vehicle lamp in such a manner as to restrict the state of illuminating the one or some illuminated regions, based on position information having a correlation with a position of a vehicle ahead, wherein the controller calculates a predicted position to which the vehicle ahead is predicted to move after a fixed time period from a reference time, based on the position information that is acquired anew at the reference time, an amount of change in position of the vehicle ahead calculated from pieces of the position information that is acquired during a predetermined time period before the reference time, and information on a travel road on which the vehicle ahead travels.

2. The vehicle lamp system according to claim 1, wherein the controller controls the vehicle lamp in such a manner as to restrict the state of illuminating the one or some illuminated regions including the predicted position.

3. The vehicle lamp system according to claim 2, wherein the vehicle lamp includes a light source that is able to change a state of illuminating each of 100 or more illuminated regions individually that are separate in the vehicle-width direction in the high-beam light-distribution pattern.

4. The vehicle lamp system according to claim 1, that wherein the controller includes a counter that, in the predetermined time period before the reference time, counts a number of cases where a difference between (i+1)-th (i=1 to n) position information on the vehicle ahead and i-th position information on the vehicle ahead is a positive value and a number of cases where the difference is a negative value, individually, and a travel road determiner that determines whether the travel road on which the vehicle ahead travels is a curve, based on a number of counts C1 of the case where the difference is a positive value and a number of counts C2 of the case where the difference is a negative value, and the travel road determiner determines that the travel road is a curve when $|C1-C2|>A$ (A being a predetermined positive number).

5. The vehicle lamp system according to claim 4, wherein the controller varies, depending on whether the travel road is a curve, a weighting coefficient of the amount of change in position used in calculation of the predicted position.

6. The vehicle lamp system according to claim 5, wherein in the controller, a weighting coefficient D1 of the amount of change in position used when $|C1-C2|>A$ (A being a predetermined positive number) is greater than a weighting coefficient D2 of the amount of change in position used when $|C1-C2|\leq A$.

7. The vehicle lamp system according to claim 5, wherein in the controller, a predetermined time period T1 used to calculate the amount of change in position when $|C1-C2|>A$ (A being a predetermined positive number) is shorter than a predetermined time period T2 used to calculate the amount of change in position when $|C1-C2|\leq A$.

8. A control device that controls a vehicle lamp that is able to form a high-beam light-distribution pattern in which a state of illuminating one or some illuminated regions is changed among illuminated regions that are separate in a vehicle-width direction ahead of an own vehicle, the control device comprising a controller that is able to control the vehicle lamp in such a manner as to restrict the state of illuminating the one or some illuminated regions, based on position information having a correlation with a position of a vehicle ahead, wherein the controller calculates a predicted position to which the vehicle ahead is predicted to move after a fixed time period from a reference time, based on the position information that is acquired anew at the reference time, an amount of change in position of the vehicle ahead calculated from pieces of the position information that is acquired during a predetermined time period before the reference time, and information on a travel road on which the vehicle ahead travels.

9. An illuminating state restriction method of controlling, based on position information having a correlation with a position of a vehicle ahead, a vehicle lamp that is able to form a high-beam light-distribution pattern in which a state of illuminating one or some illuminated regions is changed among illuminated regions that are separate in a vehicle-width direction ahead of an own vehicle, in such a manner as to restrict the state of illuminating the one or some illuminated regions, the illuminating state restriction method comprising a step of calculating a predicted position to which the vehicle ahead is predicted to move after a fixed time period from a reference time, based on the position information that is acquired anew at the reference time, an amount of change in position of the vehicle ahead calculated from pieces of the position information that is acquired during a predetermined time period before the reference time, and information on a travel road on which the vehicle ahead travels.

10. A computer-readable recording medium storing a program to be executed by a controller that controls, based on position information having a correlation with a position of a vehicle ahead, a vehicle lamp that is able to form a high-beam light-distribution pattern in which a state of illuminating one or some illuminated regions is changed among illuminated regions that are separate in a vehicle-width direction ahead of an own vehicle, in such a manner as to restrict the state of illuminating the one or some illuminated regions, the program characterized by causing the controller to perform a step of calculating a predicted position to which the vehicle ahead is predicted to move after a fixed time period from a reference time, based on the position information that is acquired anew at the reference time, an amount of change in position of the vehicle ahead calculated from pieces of the position information that is acquired during a predetermined time period before the reference time, and information on a travel road on which the vehicle ahead travels.

* * * * *